United States Patent
Madhusudana et al.

(10) Patent No.: US 9,104,334 B2
(45) Date of Patent: Aug. 11, 2015

(54) PERFORMANCE IMPROVEMENTS IN INPUT/OUTPUT OPERATIONS BETWEEN A HOST SYSTEM AND AN ADAPTER-COUPLED CACHE

(71) Applicant: LSI Corporation, San Jose, CA (US)

(72) Inventors: Naresh Madhusudana, Bangalore (IN); Naveen Krishnamurthy, Bangalore (IN); Kashyap Desai, Bangalore (IN)

(73) Assignee: Avago Technologies General IP (Singapore) Pte. Ltd, Singapore (SG)

(*) Notice: Subject to any disclaimer, the term of this patent is extended or adjusted under 35 U.S.C. 154(b) by 0 days.

(21) Appl. No.: 14/106,045

(22) Filed: Dec. 13, 2013

(65) Prior Publication Data

US 2015/0058557 A1 Feb. 26, 2015

Related U.S. Application Data

(60) Provisional application No. 61/867,632, filed on Aug. 20, 2013.

(30) Foreign Application Priority Data

Nov. 29, 2013 (IN) .......................... 5512/CHE/2013

(51) Int. Cl.
*G06F 3/06* (2006.01)

(52) U.S. Cl.
CPC .............. *G06F 3/0655* (2013.01); *G06F 3/061* (2013.01); *G06F 3/0689* (2013.01)

(58) Field of Classification Search
CPC ..... G06F 11/079; G06F 11/22; G06F 21/564; G06F 2221/2101; G06F 3/061; G06F 3/0689; G06F 3/067; G06F 11/1076; H04L 41/069
See application file for complete search history.

(56) References Cited

U.S. PATENT DOCUMENTS

| | | | |
|---|---|---|---|
| 6,219,693 B1 * | 4/2001 | Napolitano et al. | 709/203 |
| 6,957,294 B1 * | 10/2005 | Saunders et al. | 711/4 |
| 7,340,555 B2 | 3/2008 | Ashmore et al. | |
| 8,181,239 B2 | 5/2012 | Pandya | |
| 8,332,531 B2 | 12/2012 | Freimuth et al. | |
| 2009/0113154 A1 * | 4/2009 | Guan et al. | 711/163 |
| 2009/0240783 A1 * | 9/2009 | Susairaj et al. | 709/217 |
| 2011/0087833 A1 * | 4/2011 | Jones | 711/104 |
| 2011/0320861 A1 * | 12/2011 | Bayer et al. | 714/5.11 |
| 2013/0179732 A1 * | 7/2013 | Alanis et al. | 714/27 |
| 2014/0164545 A1 * | 6/2014 | Davis et al. | 709/212 |

* cited by examiner

*Primary Examiner* — Farley Abad

(57) ABSTRACT

A modified or host driver operable on a host computer communicates with a host interface of a PCIe adapter. A controller memory space is managed by the kernel space of the host operating system. The modified driver entirely avoids the overhead associated with making a copy from the application or user space to a separate kernel space managed by the operating system in the host computer. The modified driver uses a base address register to identify the location of the cache storage in the controller memory space. The size of the cache store is communicated to the modified driver upon a power on initialization of the PCIe adapter and the host computer. A memory map managed by the modified driver identifies cache storage locations as an offset from the base address register.

20 Claims, 9 Drawing Sheets

PERFORMANCE IMPROVEMENTS IN INPUT/OUTPUT OPERATIONS BETWEEN A HOST SYSTEM AND AN ADAPTER-COUPLED CACHE

TECHNICAL FIELD

The invention relates generally to host system bus adapters and, more specifically, to adapters employing a cache memory.

BACKGROUND

A typical data storage system includes one or more arrays of magnetic disk drives or similar non-volatile storage devices, and an adapter or controller that controls the manner and locations in which data is written to and read from the devices. It is important that a host system be able to reliably access all of the data in the data storage system. However, a potential problem that affects data storage systems is that one or more of the devices can fail or malfunction in a manner that prevents the host system from accessing some or all of the data stored on that device.

A redundant array of inexpensive (or independent) disks (RAID) is a common type of data storage system that addresses the above-referenced reliability problem by enabling recovery from the failure of one or more storage devices. For example, in the system illustrated in FIG. 1, a RAID controller 10 controls a storage array 12 in a manner that enables such recovery. A host (computer) system 14 stores data in and retrieves data from storage array 12 via RAID controller 10. That is, a processor 16, operating in accordance with an application program 18, issues requests for writing data to and reading data from storage array 12. Although for purposes of clarity host system 14 and RAID controller 10 are depicted in FIG. 1 as separate elements, it is common for a RAID controller 10 to be physically embodied as a card that plugs into a motherboard or backplane of such a host system 14.

It is known to incorporate data caching in a RAID protected storage system. In the storage system illustrated in FIG. 1, RAID controller 10 includes a RAID processing system 20 that caches data in units of blocks, which can be referred to as read cache blocks (RCBs) and write cache blocks (WCBs). The WCBs comprise data that host system 14 sends to RAID controller 10 as part of requests to store the data in storage array 12. In response to such a write request from host system 14, RAID controller 10 caches or temporarily stores a WCB in one or more cache memory modules 22, then returns an acknowledgement message to host system 14. At some later point in time, RAID controller 10 transfers the cached WCB (typically along with other previously cached WCBs) to storage array 12. The RCBs comprise data that RAID controller 10 has frequently read from storage array 12 in response to read requests from host system 14. Caching frequently requested data is more efficient than reading the same data from storage array 12 each time host system 14 requests it, since cache memory modules 22 are of a type of memory, such as flash or Dual Data Rate (DDR) memory, that can be accessed much faster than the type of memory (e.g., disk drive) that data storage array 12 comprises.

Various RAID schemes are known. The various RAID schemes are commonly referred to by a "level" number, such as "RAID-0," "RAID-1," "RAID-2," etc. As illustrated in FIG. 1, storage array 12 in a conventional RAID-5 system can include, for example, four storage devices 24, 26, 28 and 30 (e.g., arrays of disk drives). In accordance with the RAID-5 scheme, data blocks, which can be either RCBs or WCBs, are distributed across storage devices 24, 26, 28 and 30. Distributing logically sequential data blocks across multiple storage devices is known as striping. Parity information for the data blocks distributed among storage devices 24, 26, 28 and 30 in the form of a stripe is stored along with that data as part of the same stripe. For example, RAID controller 10 can distribute or stripe logically sequential data blocks A, B and C across corresponding storage areas in storage devices 24, 26 and 28, respectively, and then compute parity information for data blocks A, B and C and store the resulting parity information P_ABC in another corresponding storage area in storage device 30.

A processor 32 in RAID processing system 20 is responsible for computing the parity information. Processing system 20 includes some amount of fast local memory 34, such as double data rate synchronous dynamic random access memory (DDR SDRAM) that processor 32 utilizes when performing the parity computation. To compute the parity in the foregoing example, processor 32 reads data blocks A, B and C from storage devices 24, 26 and 28, respectively, into local memory 34 and then performs an exclusive disjunction operation, commonly referred to as an Exclusive-Or (XOR), on data blocks A, B and C in local memory 34. Processor 32 then stores the computed parity P_ABC in data storage device 30 in the same stripe in which data blocks A, B and C are stored in data storage devices 24, 26 and 28, respectively. The above-described movement of cached data and computed parity information is indicated in a general manner in broken line in FIG. 1.

The RAID-5 scheme employs parity rotation, which means that RAID controller 10 does not store the parity information for each stripe on the same one of data storage devices 24, 26, 28 and 30 as the parity information for all other stripes. For example, as shown in FIG. 1, parity information P_DEF for data blocks D, E and F is stored on storage device 28, while data blocks D, E and F are stored in the same stripe as parity information P_DEF but on storage devices 24, 26 and 30, respectively. Similarly, parity information P_GHJ for data blocks G, H and J is stored on storage device 26, while data blocks G, H and J are stored in the same stripe as parity information P_GHJ but on storage devices 24, 28 and 30, respectively. Likewise, parity information P_KLM for data blocks K, L and M is stored on storage device 24, while data blocks K, L and M are stored in the same stripe as parity information P_KLM but on storage devices 26, 28 and 30, respectively.

The described parity calculation and storage of the parity block requires time and resources to complete. A cache enabled storage controller provides maximum throughput from the host to the storage controller when a write-back cache policy is implemented. When such a write-back methodology is used, a host computer write operation is processed by temporarily storing the information associated with the write request to the cache. Once the information is saved in the cache, the storage controller reports to the host computer that the write operation is complete. Consequently, from the perspective of the host computer, the write operation is complete. Future requests for the information located in the cache are supported by reading the information and forwarding the same to the host computer.

Thereafter, the storage controller will locate, arrange and flush the information from the cache to the data storage devices supporting the RAID protected storage volume. The storage controller may perform these operations to minimize overhead and hard disk drive write head movement.

SUMMARY

A modified driver enabled on a host computer employs a novel method that minimizes the latency of data transfers to a cache communicatively coupled to a peripheral component interconnect express (PCIe) adapter coupled to the host computer. The modified driver maintains a map of the cache storage space. The modified driver bypasses memory copies to a host kernel space by framing commands with destination addresses in the PCIe adapter managed cache. The modified driver updates a host cache journal and sends the framed commands to the PCIe adapter. The host cache journal manages journals for all registered entities and functions as a generic interface for any low-level device driver.

An example embodiment of a method for processing data transfers between a host computing device or host system and a cache supporting a PCIe adapter. The method includes the steps of receiving, with a PCIe adapter interface, a request originating in a host system coupled to the PCIe adapter, the request defining an input/output operation designated for a data volume supported by the PCIe adapter, information associated with the input/output operation bypassing a copy operation to a kernel space of the host system, forwarding information responsive to the request from the PCIe adapter interface to a cache coupled to the PCIe adapter and transmitting, with the PCIe adapter interface, a response to the host system, the response indicating that the input/output operation designated for the data volume supported by the PCIe adapter is complete. Thus, from the perspective of the host system, the requested I/O operation is complete even though it may be some time before the PCIe adapter completes a transfer of the data from the cache to the data storage device(s) supporting the logical data volume.

An example embodiment of a data storage system includes a host system and a PCIe adapter. The host system communicates with the PCIe adapter through a PCIe compliant channel and supports a source of an input/output operation request directed to a logical volume supported by data storage devices external to the host computer. In some embodiments, the host driver is a small computer system interface (SCSI) driver that communicates over the PCIe channel. The host driver enables a zero copy of information associated with the input/output operation to bypass a kernel space of an operating system functioning on the host computer when the information transitions from the host to the data storage devices. The PCIe adapter is communicatively coupled to the host computer via a PCIe interface. The PCIe adapter is further coupled to or includes a cache and a device interface. The PCIe adapter supports the logical volume created from the data storage devices in a primary data store. The PCIe adapter along with the host driver places the information identified by the zero copy in the adapter/controller cache.

An example embodiment of a computer-readable medium has stored thereon, in computer executable non-transitory form, instructions that, when executed by a processor of a host computer, direct the host system to process a request originating in the host system, the request defining an input/ output operation designated for a data volume supported by a PCIe adapter coupled to the host computer, information associated with the input/output operation bypassing a copy operation to a kernel space of the host system, generate a media access control to physical layer interface command that instructs the PCIe adapter to access a cache coupled to the PCIe adapter, wait for an indication from the PCIe adapter that the input/output operation was completed by the PCIe adapter and forward information to a source of the request indicating that the input/output operation designated for the data volume is complete.

These and other features and advantages of the present storage systems, computer-readable media and methods for processing data transfers between a host system and a cache coupled to a PCIe adapter will become apparent from the following description, drawings and claims.

DETAILED DESCRIPTION OF ILLUSTRATIVE EMBODIMENTS

Figure 1:
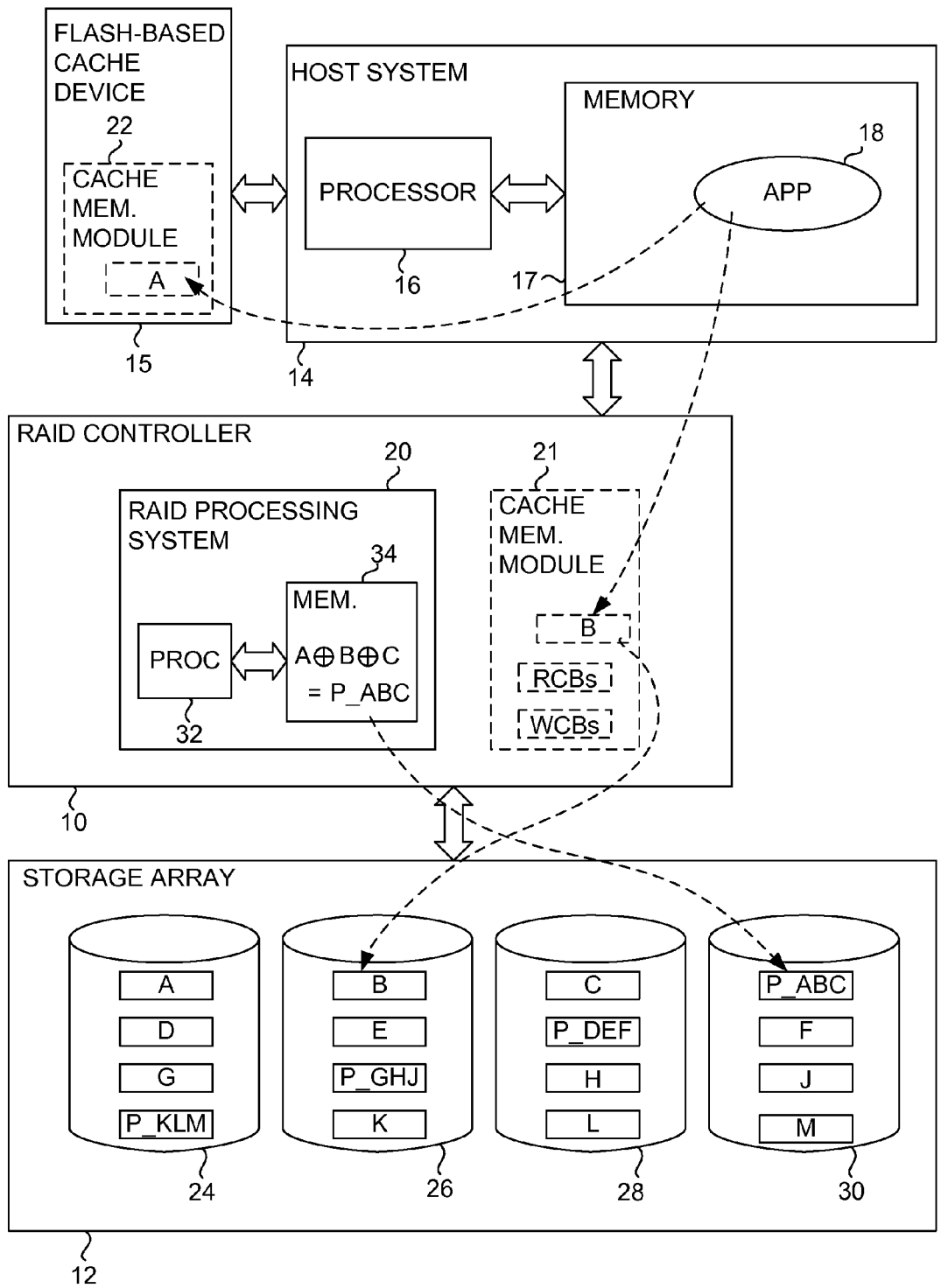
FIG. 1 includes a block diagram that illustrates an embodiment of a conventional data storage system.

Performance improvements in I/O operations between a host system and an adapter-coupled cache are embodied in a data storage system, a method for processing data transfers between a host system and a cache in the data storage system, and a computer-readable medium. Both the method for processing data transfers and the data storage system are enabled by a modified driver operable on a host computer or host system. The modified driver employs a novel method that minimizes the latency of data transfers to a cache communicatively coupled to a PCIe adapter, which is further coupled to the host system. The modified driver maintains a map of the PCIe adapter cache storage space. The modified driver bypasses memory copies to a host kernel space by framing commands with destination addresses in the PCIe adapter cache. The modified driver updates a host cache journal and sends a command to the PCIe adapter. The PCIe adapter, in response to the command received from the host, updates a controller cache journal and returns an indication that an input/output (I/O) operation identified by the command is complete.

The modified driver communicates with a host interface of the PCIe adapter via the peripheral component interconnect express (PCIe) protocol. The PCIe memory space is managed by the kernel space of the host operating system. Thus, performance of I/O operations between the host computer and the PCIe adapter can benefit by avoiding the kernel space. The modified driver entirely avoids the overhead associated with making a copy from the application or user space to a separate kernel space managed by the operating system in the host computer. The modified driver uses a base address register to identify the location of the cache storage in the PCIe memory space. The size of the cache store is communicated to the modified driver upon a power-on initialization of the PCIe adapter and the host computer. A memory map managed by the modified driver identifies cache storage locations as an offset from the base address register.

Firmware, hardware or software within the PCIe adapter need not be modified in any way to support the improved host driver enabled methods for managing data transfers between the host computer and the PCIe adapter. As described, kernel space in the host computer is mapped to the PCIe memory space. The modified driver responds to host access to the identified memory locations by generating a MAC-PHY interface (MPI) command that results in the appropriate read or write of the cache memory.

Under certain circumstances, the modified driver may send a flush cache command to the PCIe adapter. The host system may be arranged with a cache monitor that determines when a percentage of cache lines filled exceeds a threshold value. When the threshold value is exceeds, the modified driver may send a cache flush command to the PCIe adapter. Alternatively, an application executing on the host system may direct the modified driver to issue the cache flush command to the PCIe adapter. When the modified driver issues the cache flush command, the modified driver waits for an indication that the cache lines are flushed and available for future write operations before generating commands identifying the flushed storage locations from the cache. The modified driver records the information in the host cache journal.

Under certain circumstances, the PCIe adapter may dictate a write operation to a RAID supported data volume supported by the PCIe adapter. One such circumstance may be when the percentage of cache lines filled exceeds a threshold as determined by a firmware monitor in the PCIe adapter. An alternative circumstance may be when the PCIe adapter receives a cache flush command from the modified driver. When this is the case, the PCIe adapter uses the controller cache journal to select a set of contiguous cache lines. The select set of contiguous cache lines may include "dirty" cache lines. A dirty cache line contains data that has changed and needs to be written to the RAID supported data volume. The PCIe adapter directs the I/O operations to the RAID supported data volume and updates the controller cache journal. Thereafter, the PCIe adapter sends a notice to the modified driver in the host system. The notice informs the host system that the cache lines have been flushed and are no longer present in the cache. In response to the notice, the modified driver updates the host journal accordingly. Thereafter, the host system considers the cache lines to be free for future storage.

Figure 2:
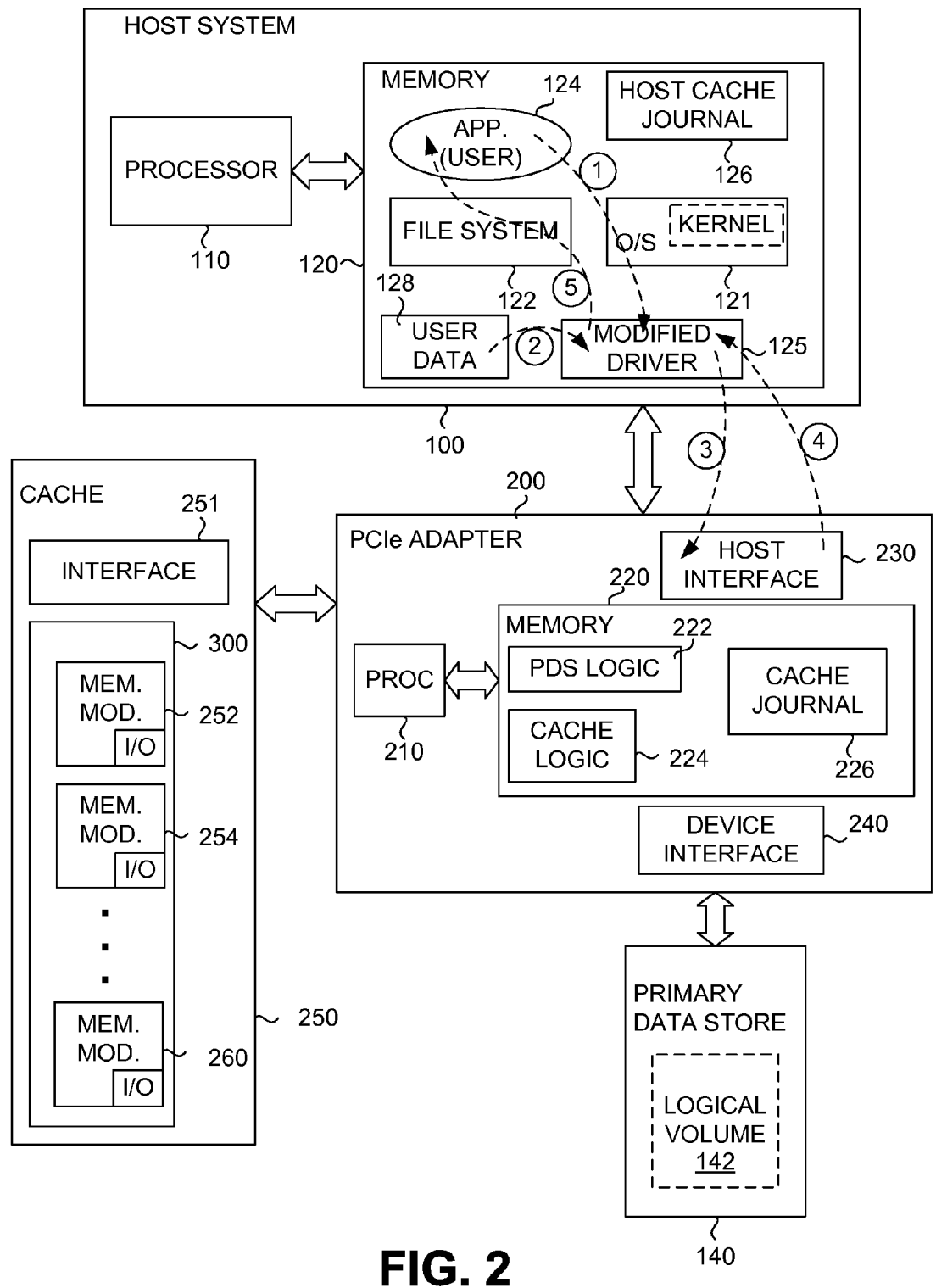
FIG. 2 includes a block diagram that illustrates an embodiment of an improved data storage system.

Attention is now directed to the illustrated embodiments of the improved storage system, computer-readable medium, and methods for processing data transfers between a host computer or host system and a cache coupled to a PCIe adapter as shown in FIGS. 2-9. FIG. 2 includes a block diagram that illustrates an embodiment of an improved data storage system. The improved data storage system includes a host computer or host system 100, a PCIe adapter 200, a cache 250 and a primary data store 140.

Host system 100 communicates with the PCIe adapter 200 which in turn stores data in primary data store 140. The cache 250 is used by the PCIe adapter 200 to reduce the time or latency for retrieving data from the primary data store 140. In preferred embodiments, the contents of the cache store 300 are not exposed to the application level programs executing in the host system 100. In these preferred embodiments, the PCIe adapter 200 alone is responsible for managing the cache 250.

The host system 100 includes at least one processor 110 in communication with a memory element 120 via a communication bus represented by a two-way arrow. The memory 120 includes an operating system 121, which manages a file system 122 and that also includes application software and associated data represented in the illustration as APPs 124. One or more of APP(s) 124 and/or the file system 122, under the direction of the operating system 121, communicate with the PCIe adapter 200 to store files, programs, user data 128 or other information in an organized way in the primary data store 140. A host or modified driver 125 enables and manages the transfer of data between the host system 100 and the PCIe adapter 200. The memory 120 further includes a host cache journal 126 that is maintained by the modified driver 125 to enable one or more of the APP(s) 124 to interface with the PCIe adapter 200 and to recover from power loss situations. As described, the host cache journal manages data for all registered entities and functions as a generic interface for any low-level device driver operative on the host system 100.

From the perspective of the host system 100, data stored in the primary data store 140 appears as one or more logical data volumes 142 even though the data may be distributed across a set of hard disk drives or solid-state data storage devices. Stated another way, the host system 100 is aware of one or more logically separated storage locations or letter labeled drives.

Host system 100 is a computing device such as a server or other computer that functions in accordance with one or more operating system(s) (O/S) 121 and is capable of executing one or more applications, such as APP 124. Host system 100 further includes the modified or host driver 125, which connects the APP 124 and the O/S 121 to the data volume(s) in the primary data store 140. The host system 100 may include one or more additional interfaces such as human-to-machine interfaces (not shown) to support configuration and interaction with an operator.

The PCIe adapter 200 includes one or more processors such as the processor 210, a memory element 220, host interface 230 and device interface 240. The processor 210 and the memory element 220 communicate via a bus illustrated with a two-way arrow. The memory 220 includes primary data store or PDS logic 222 (e.g., one or more programs or routines) for managing data transfers between the primary data store 140 and the host system 100 and cache logic 224 for managing data transfers between the host system 100 or the primary data store 140 and the controller cache 250. The memory 220 further includes a cache journal 226 for separately monitoring the contents of the cache store 300. Thus, the host system 100 and the PCIe adapter 200 maintain respective cache journals.

Host interface 230 receives commands and data from the modified driver 125 of the host system 100 and performs any necessary translations before forwarding the same to the PDS logic 222 and the cache logic 224. The modified driver 125 and the host interface 230 communicate with each other using the PCIe communication protocol.

The processor 210 is a hardware device for executing firmware and or software particularly PDS logic 222 and cache logic 224 stored in the memory 220, which can be supported by a read-only memory element. The processor 210 can be constructed in accordance with a custom made or a commercially available integrated-circuit based processor, or can even be a standalone central processing unit (CPU); an auxiliary processor among several processors associated with PCIe compliant device; a semiconductor-based microprocessor (in the form of a microchip or chip set); or generally any device for executing software instructions stored in the memory 220. The processor 210, in accordance with the cache logic 224, manages data transfers between the cache store 300 and the PCIe adapter 200. An interface 251 in the cache 250 buffers or translates information signals from the PCIe adapter 200 before forwarding the same to the designated I/O interfaces of the memory modules 252-260. The data transfers as managed by the PCIe adapter 200 include cache write operations to designated memory modules 252 through 260, which may be implemented with DDR memory modules or solid-state storage devices. The data transfers further include cache flush operations that include information that is written to the primary data store 140 by way of the device interface 240.

Although for purposes of clarity host system 100 and the PCIe adapter 200 are depicted in FIG. 2 as separate elements, it is common for storage controllers to be physically embodied as an integrated circuit card that plugs into a motherboard or backplane (not shown) of such a host system 100.

The primary data store 140 may include one or more hard-disk drives. The one or more hard-disk drives may include a set of magnetic platters that are modified by read/write heads that are controlled via an electro-mechanical control system. When data is to be written to the hard-disk drive a current is controllably applied to the write heads to adjust the magnetic poles in discrete tracks arranged along the magnetic platters as the platters rotate. When data is to be read from the hard-disk drives read heads are controllably placed over the tracks as the platters rotate. The read heads generate a signal that is responsive to changes in a magnetic field as the platters rotate. The time it takes to controllably position the read/write heads and the time it takes to communicate the data to or from the interface to the hard-disk drive contribute to the overall responsiveness of the one or more hard-disk drives. While there are a number of techniques for minimizing the time it takes to read or write data and process the same so that the data can be made available to the host system 100 from the primary data store 140, it is typically the case that data can be written to and read from the memory modules 252-260 of the cache store 300 significantly faster than when these similar I/O operations are performed with a hard-disk drive or a system of hard-disk drives.

Accordingly, the PCIe adapter 200 is provided for identifying or acting in response to the identification of "hot" or frequently accessed data that is already stored in the primary data store 140. The PCIe adapter 200 acting in response to such an indication, will store a copy of the hot data in the cache store 300 so that future requests for the information from the host system 100 can be fulfilled much more quickly by the combination of the cache store 300 and the PCIe adapter 200 than by the combination of the PCIe adapter 200 and the primary data store 140.

The cache 250 includes an interface 251 and a set of N memory modules, where N is an integer. In the illustrated embodiment, each of the N memory modules 252-260 includes or is supported by a dedicated I/O interface for transferring data to and from the integrated circuit elements therein that provide the addressable circuit locations for storing information. For embodiments that are expected to store only data that has been previously stored in the primary store 140, N may be as small as one. For embodiments that are expected to store data that is being stored in the controller cache 250 until a later time when the data can be written to the primary store 140, N may be as small as three or as large as desired. In these situations, one of the N memory modules may be used to store parity information.

I/O operation flow from the host system 100 to the PCIe adapter 200 is generally illustrated by the numbered arrows illustrated with dashed lines in FIG. 2. That is, requests generated in the O/S 121 or in APP 124 for I/O operations are forwarded as indicated by the arrow labeled "1" to the modified driver 125. Thus, the O/S 121 and/or the APP 124 are a source of the I/O operation request. As indicated by the arrow labeled "2," user data 128 identified in the request is also forwarded from the host system 100 to the modified driver 125, thus avoiding a copy to the kernel space of the host system 100. As indicated by the finely dashed line, the PCIe compliant modified driver 125 enables a zero copy or direct data transfer of information associated with the input/output operation to the cache store 300 coupled to the PCIe adapter 200. Thus, the data bypasses or avoids a copy operation to a kernel space of the O/S 121 of the host system 100. As indicated by the arrow labeled "3," the modified driver 125 generates a MAC-PHY interface (MPI) command and forwards the same via the PCIe compliant interface to the host interface 230. As indicated by the arrow labeled "4," the host interface 230 of the PCIe adapter 200 sends an indication to the modified driver 125 that the I/O operation is complete. The indication is sent even though the information identified in the I/O operation is only in the cache store 300. Upon receipt of the indication from the host interface 230, the modified driver 125 forwards an indication, as illustrated by the arrow labeled "5," to the APP 124. The indication instructs the APP 124 that the I/O operation request has been completed. Thereafter, the I/O operation is completed by the PCIe adapter 200, which will manage the transfer of the data in due course to the primary data store 140.

Figure 3:
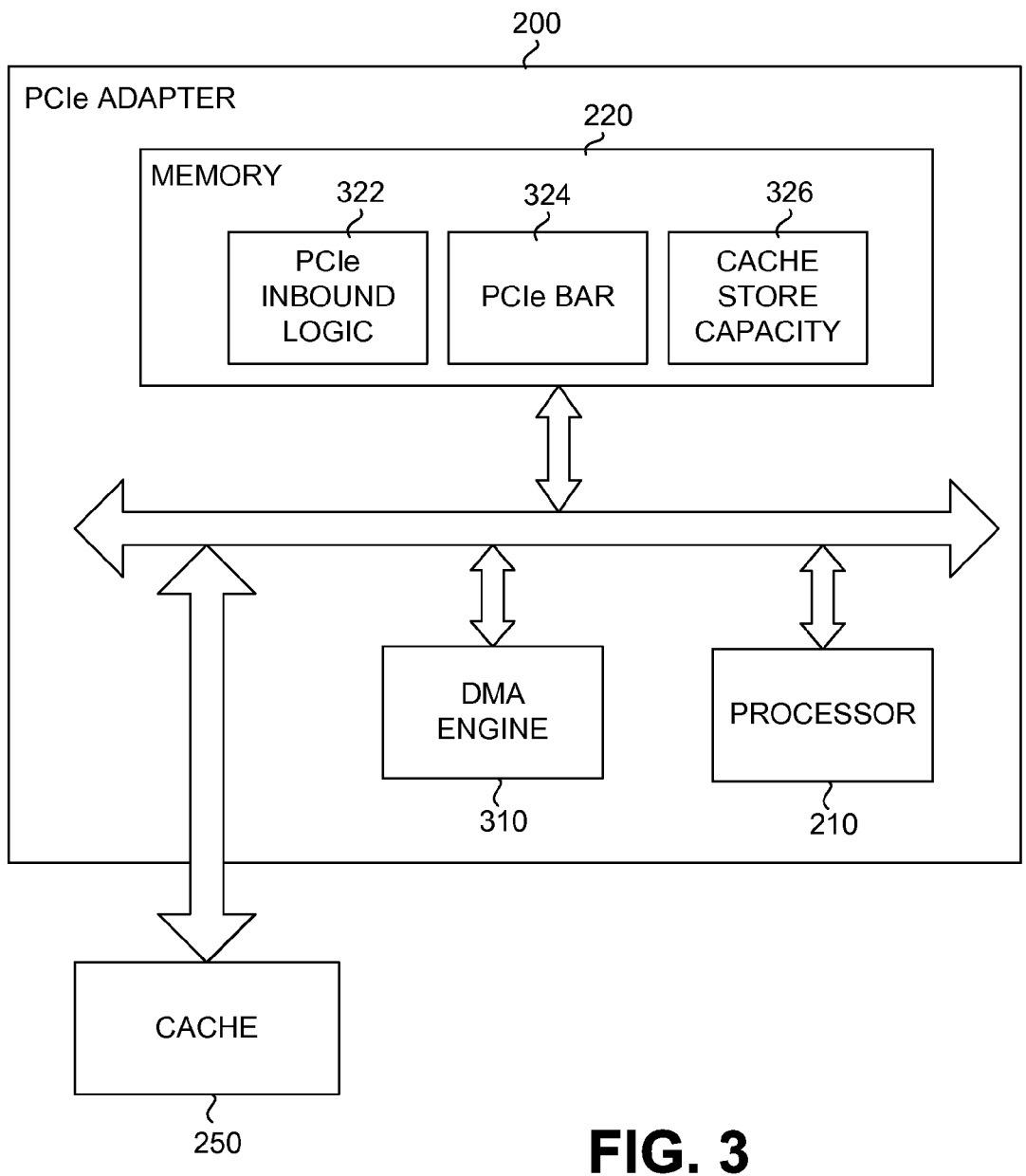
FIG. 3 includes a block diagram that illustrates an embodiment of the PCIe adapter of FIG. 2.

FIG. 3 includes a block diagram that illustrates an embodiment of the PCIe adapter 200 of FIG. 2. The PCIe adapter 200 includes a processor 210, memory element 220 and a direct memory access engine 310 coupled to each other via a communication bus. As indicated, the communication bus is also coupled to the cache 250. Although the cache 250 is illustrated as a device that is external to the PCIe adapter 200, it should be understood that the cache 250 can be integrated with the PCIe adapter 200 in one or more dedicated memory elements (not shown) coupled to the communication bus. In still other embodiments, the cache 250 may be supported by a portion of the integral memory 220.

As further indicated, the memory 220 includes PCIe inbound memory access logic 322, a PCIe base address register 324 and a register 326, which contains a cache store capacity in bytes. Upon an initial power on of the host system 100 and the communicatively coupled PCIe adapter 200, the PCIe adapter 200 forwards the information in the PCIe base address register 324 and the cache store capacity in register 326 to the host system 100. The PCIe adapter 200 uses PCIe inbound logic 322 and/or firmware (not shown) to manage the storage of data identified in inbound I/O operation requests from the host system 100.

Figure 4:
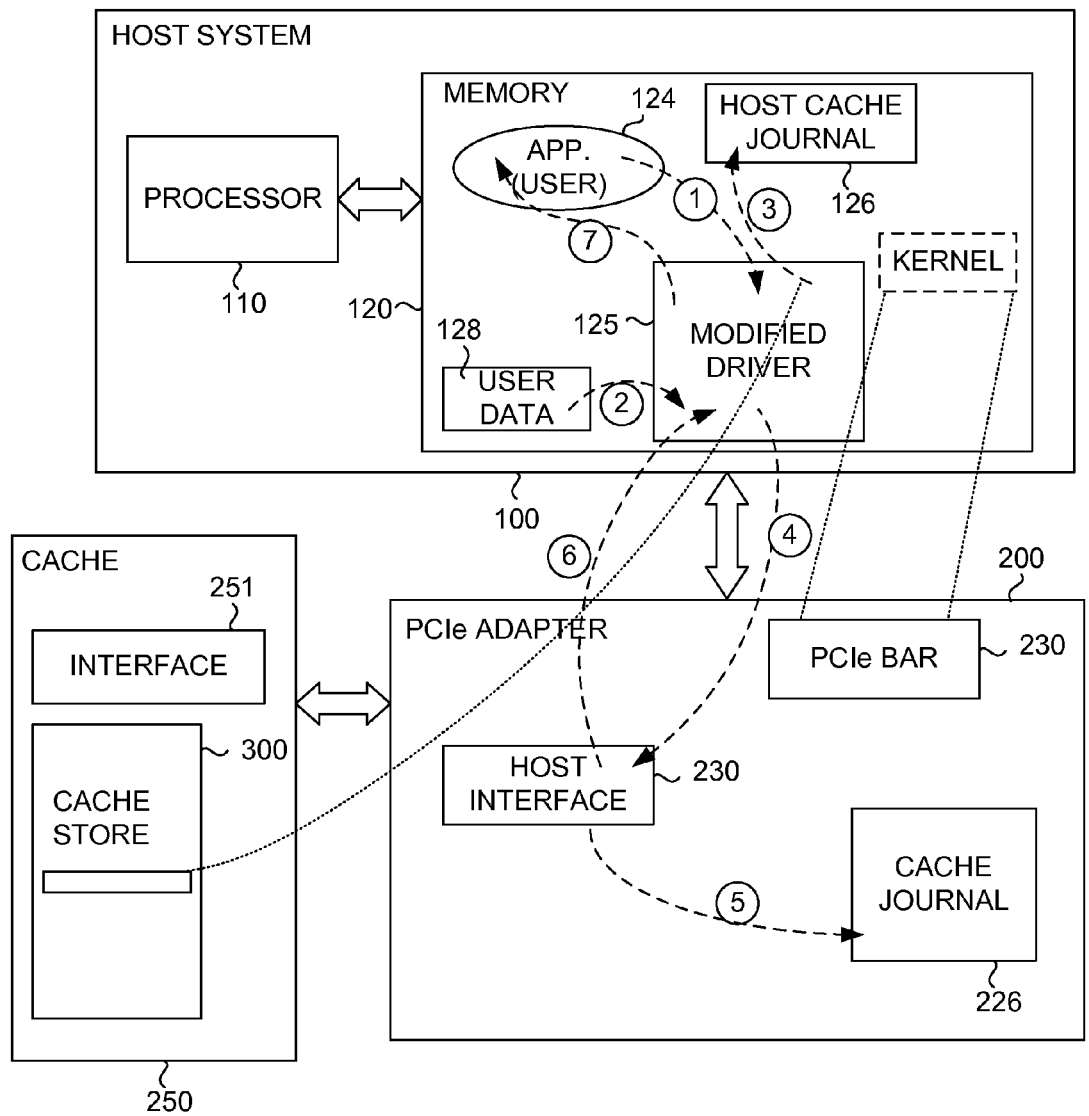
FIG. 4 includes a block diagram that illustrates management of I/O operations by the modified driver and PCIe adapter firmware.

FIG. 4 includes a block diagram that illustrates management of I/O operations by the modified driver 125 and PCIe adapter 200 including management of respective cache journals. As indicated by finely dashed lines, the kernel space of the host system 100 is mapped to a PCIe-coupled memory space by offsetting memory addresses from the PCIe base address register 324. The cache logic 224 (FIG. 2) can use this offset relationship to map the contents of the cache store 300 to the kernel space of the host system 100. Consequently, the modified driver 125 can generate MPI commands that enable direct copies to be made from the host system 100 to the cache store 300.

As described, requests generated in APP 124 for an I/O operation is forwarded as indicated by the arrow labeled "1" to the modified driver 125. Thus, the O/S 121 (not shown) and/or the APP 124 are a source of the I/O operation request. As indicated by the arrow labeled "2," user data 128 identified in the request is forwarded to the modified driver 125, thus avoiding a copy to the kernel space of the host system 100. The PCIe compliant modified driver 125 enables a zero copy or direct data transfer of information associated with the I/O operation to the cache store 300. Thus, the user data 128 bypasses a kernel space of the O/S 121 of the host system 100. As indicated by the arrow labeled "3," the modified driver 125 communicates with the host cache journal 126 to maintain a record in the host system 100 of the present I/O operation. As indicated by the arrow labeled "4," the modified driver 125 generates a MPI command that is communicated over the PCIe compliant interface to the host interface 230 in the PCIe adapter 200. As indicated by the arrow labeled "5," the host interface 230 communicates with the cache journal 226 to maintain a record in the PCIe adapter 200 of the present I/O operation. As indicated by the arrow labeled "6," the host interface 230 sends an indication to the modified driver 125 that the I/O operation is complete. The indication is sent even though the information identified in the I/O operation is only in the cache store 300. Upon receipt of the indication from the host interface 230, the modified driver 125 forwards an indication, as illustrated by the arrow labeled "7," to the APP 124. The indication instructs the APP 124 that the I/O operation request has been completed. Thereafter, the I/O operation is completed by the PCIe adapter 200, which will manage the transfer of the data in due course from the cache 250 to the primary data store 140.

Figure 5:
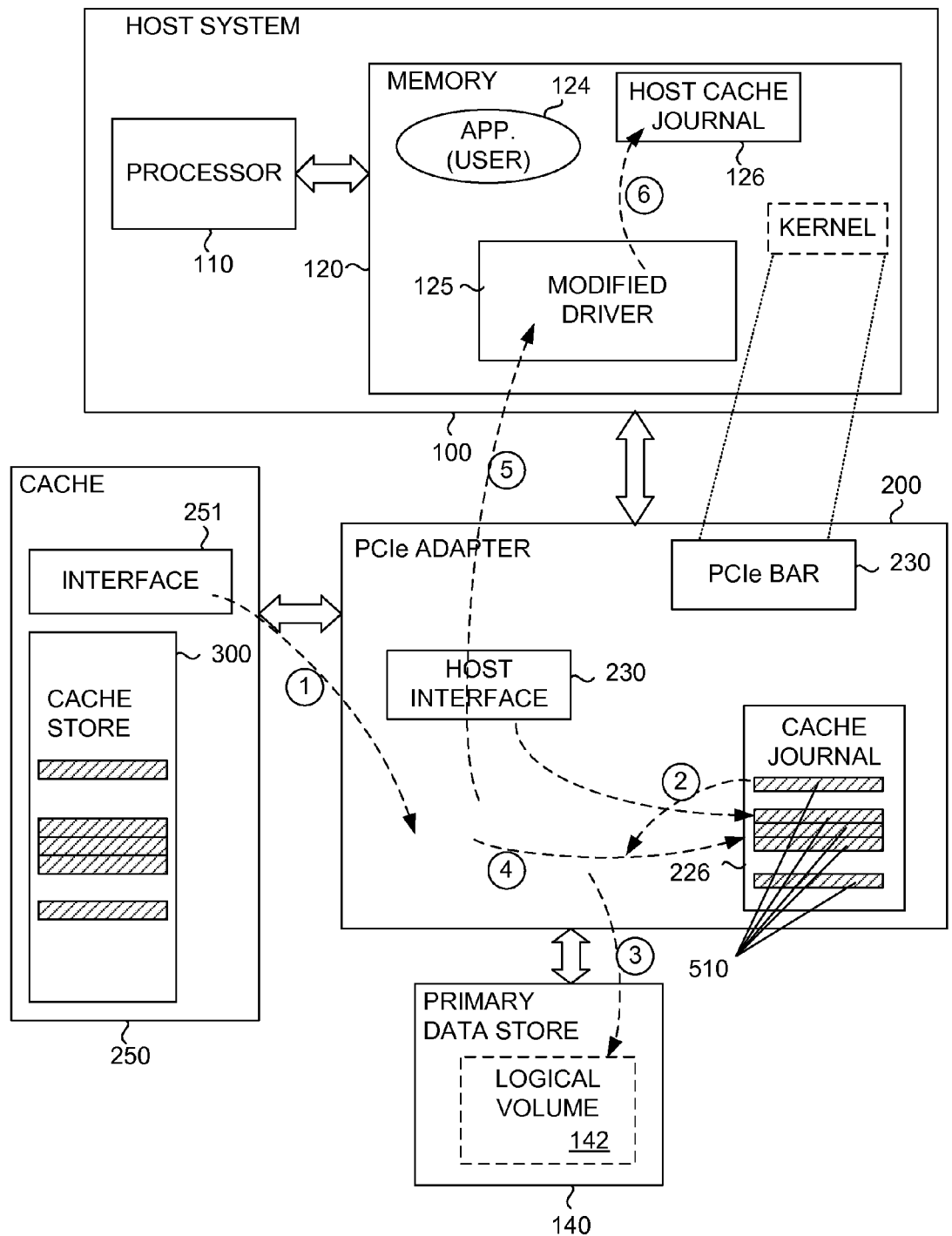
FIG. 5 includes a block diagram that illustrates cache flush operations enabled by the modified driver and PCIe adapter firmware.

FIG. 5 illustrates a cache flush operation enabled by the modified driver 125 and PCIe adapter firmware. The PCIe adapter 200 is configured to identify contiguous cache lines in the cache store 300, store the information from the contiguous cache lines to the logical volume 142, update the cache journal 226 and communicate an event to the PCIe compliant modified driver 125.

A cache flush is initiated by a monitor in the controller cache 250, a monitor in the host system 100 or executable instructions in the cache logic 224. However initiated, the cache interface 251 instructs the PCIe adapter 200 (e.g., firmware) as shown by the arrow labeled "1," to perform a cache flush operation. As indicated by the arrow labeled "2," the PCIe adapter 200 identifies contiguous lines of dirty data 510 as recorded in the cache journal 226 and forwards the information in the contiguous lines from the cache 250 to the device interface 240 (FIG. 2), which forwards the data as indicated by the arrow labeled "3," to the logical volume 142 supported by the devices in the primary data store 140. "Dirty" data is data that has been modified while in the cache or was written to the cache but is not presently in the primary data store 140.

Thereafter, the PCIe adapter 200 updates the cache journal 226 entries as indicated by the arrow labeled "4," and transmits or forwards a notice, as indicated by the arrow labeled "5," to the modified driver 125. The notice identifies the dirty cache lines that have been flushed from the cache 250 and as so marked in the cache journal 226. As indicated by the arrow labeled "6," the modified driver 125 communicates the same information to the host cache journal 126 to keep the host cache journal 126 and the cache journal 226 in synchronization with each other.

Figure 6:
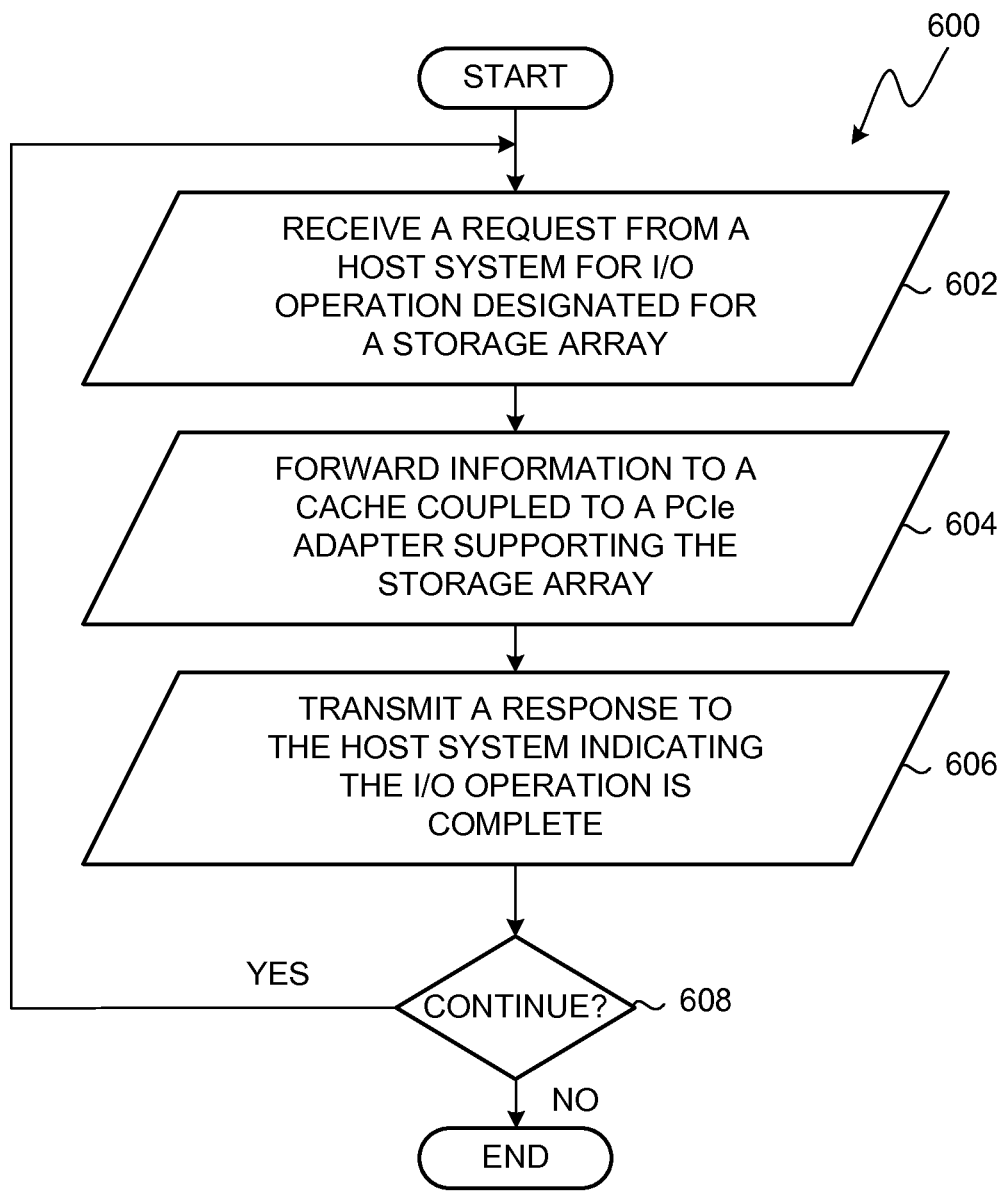
FIG. 6 includes a flow diagram that illustrates an embodiment of a method for processing data transfers between a host system and a cache supporting a PCIe adapter.

FIG. 6 includes a flow diagram that illustrates an embodiment of a method 600 for processing data transfers between a host system 100 and a cache 250 supporting the PCIe adapter 200. The functions associated with the data operation blocks illustrated in the flow diagram of FIG. 6 can be stored on a computer-readable medium. That is, processor instructions, stored thereon, in non-transitory form, that when executed by the processor 210 in the PCIe adapter 200 direct the PCIe adapter 200 to as indicated in block 602 receive a request originating in the host system 100, the request defining an I/O operation designated for a data volume 142 supported by the PCIe adapter 200. As described, information associated with the I/O operation is processed in such a way that the information is sent directly to the PCIe adapter 200 and bypasses a copy operation to a kernel space of the host system 100.

As indicated in block 604, the PCIe adapter 200 forwards the information identified in the I/O request to a cache 250 coupled to the PCIe adapter 200. As shown in block 606, the PCIe adapter 200 transmits a response to the host system 100 indicating that the I/O operation is complete. A determination is made in decision block 608 whether the method 600 should continue. When the determination is affirmative, processing continues with the function of block 602. Otherwise, the method 600 terminates.

Although not presented in the illustrated embodiment, the method 600 performed by the PCIe adapter 200 may be extended to include the following steps, which include identifying contiguous cache lines in the cache, forwarding information from the contiguous cache lines to a RAID data volume, updating the PCIe adapter cache journal 226 and communicating an indication that the cache lines have been flushed to the modified driver 125 in the host system 100.

Figure 7:
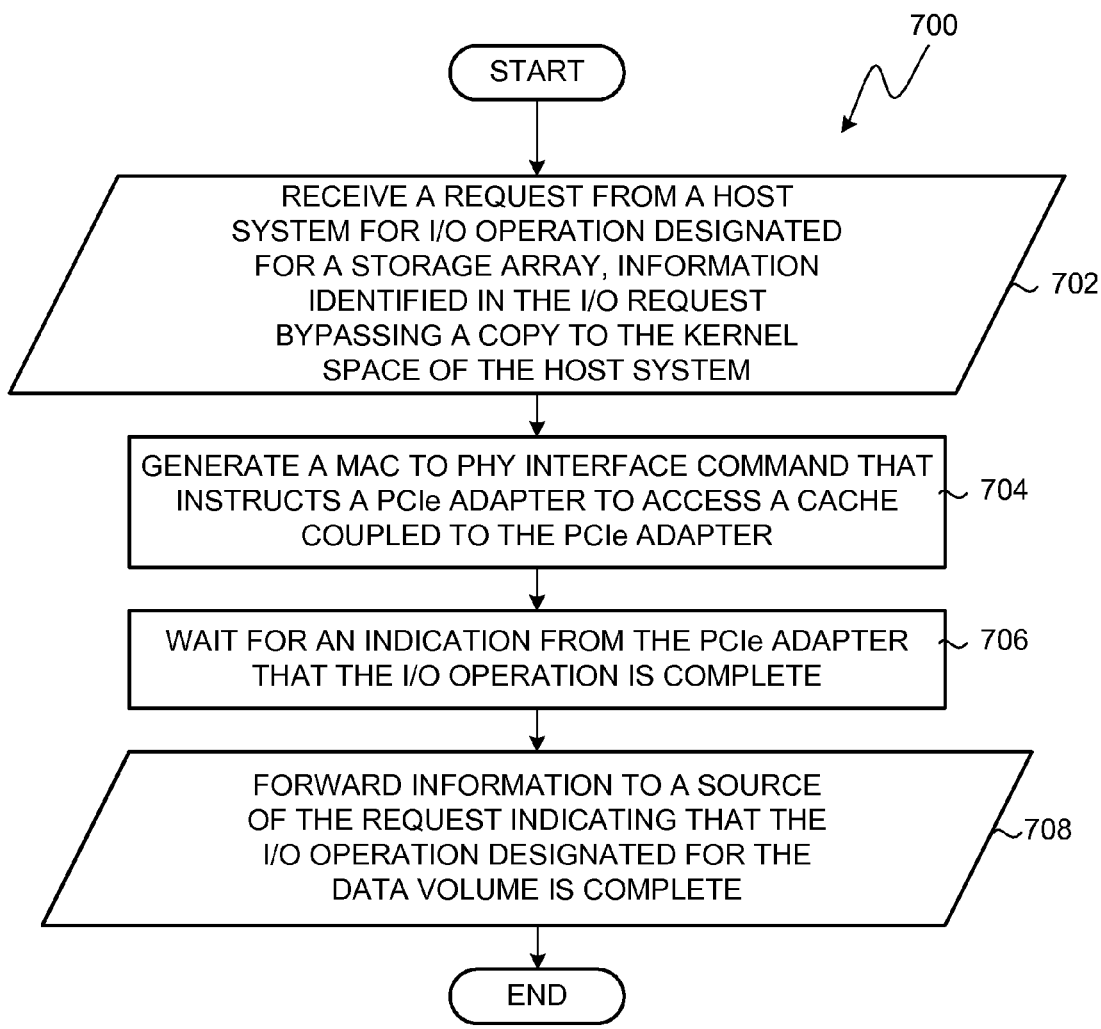
FIG. 7 includes a flow diagram that illustrates an embodiment of a method enabled by the modified driver of FIG. 2.

FIG. 7 includes a flow diagram that illustrates an embodiment of a method 700 for processing data transfers between a host system 100 and a cache 250 that can be implemented by the modified driver 125. The functions associated with the data operation blocks illustrated in the flow diagram of FIG. 7 can be stored on a computer-readable medium. That is, processor instructions, stored thereon, in non-transitory form, that when executed by the processor 110 in the host system 100 can enable a modified driver 125 to, as indicated in block 702, receive a request from source in a host system 100, the request defining an I/O operation designated for a data volume 142 supported by an array of data storage devices. As further described in block 702, information associated with the I/O operation is processed in such a way that the information is sent directly to a PCIe adapter 200 such that the information bypasses a copy operation to the kernel space of the host system 100.

In block 704, the modified driver 125 generates a MAC-PHY interface command that instructs the PCIe adapter 200 to access a cache 250 coupled to the PCIe adapter 200. In block 706, the modified driver 125 waits for an indication from the PCIe adapter 200 that the I/O operation was completed by the PCIe adapter 200. Thereafter, as shown in block 708, the modified driver 125 forwards information to a source of the request indicating that the I/O operation designated for the data volume 142 is complete.

Although not presented in the illustrated embodiment, the method 700 performed by the modified driver 125 of the host system 100 may be extended to include directing the host system 100 to modify a host cache journal 126 and mapping storage locations within the host kernel space to storage locations in the cache store 300.

Figure 8:
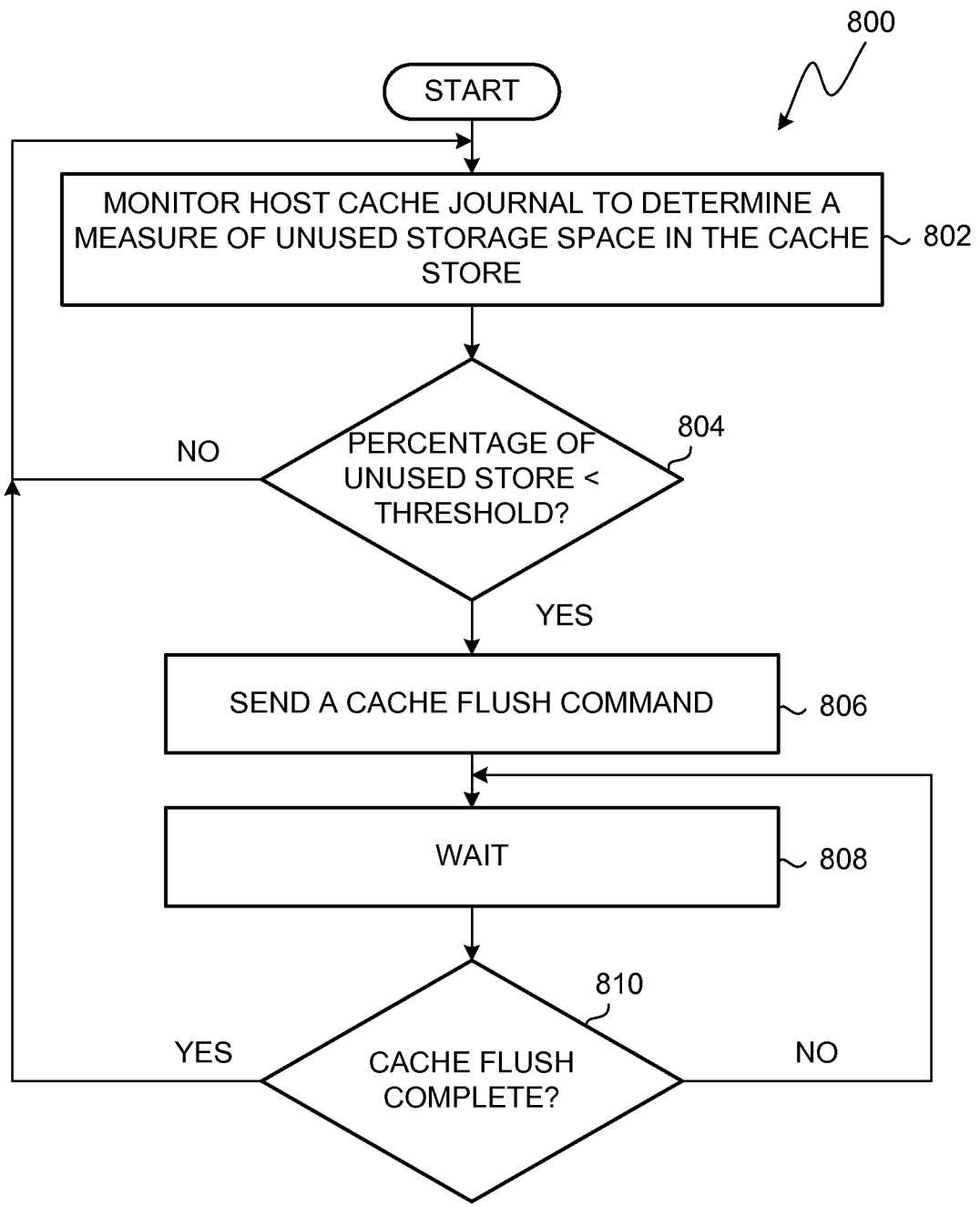
FIG. 8 includes a flow diagram that illustrates initiation of a cache flush operation by the modified driver in the host system.

FIG. 8 includes a flow diagram that illustrates a method 800 for initiation of a cache flush operation by the modified driver 125 in the host computer 100. As indicated in block 802, the host cache journal 126 is monitored to determine a measure of the unused storage space in the cache store 300. In block 804, the measure determined in block 802, or a derivation of that measure, is compared with a threshold. When the percentage of unused storage capacity in the cache store 300 is less than a threshold value, the modified driver 125 issues a cache flush command as indicated in block 806. Otherwise, processing continues by repeating the functions of block 802 and block 804.

In block 808, the modified driver 125 waits for a designated time before determining in block 810 whether the modified driver 125 has received an indication from the PCIe adapter 200 that the cache flush is complete. When the modified driver 125 has not received the indication that the cache flush operation is complete, processing returns to repeat the wait indicated in block 808. Otherwise, the method 800 continues with the function indicated in block 802 and repeats the functions in block 804 through block 810.

Figure 9:
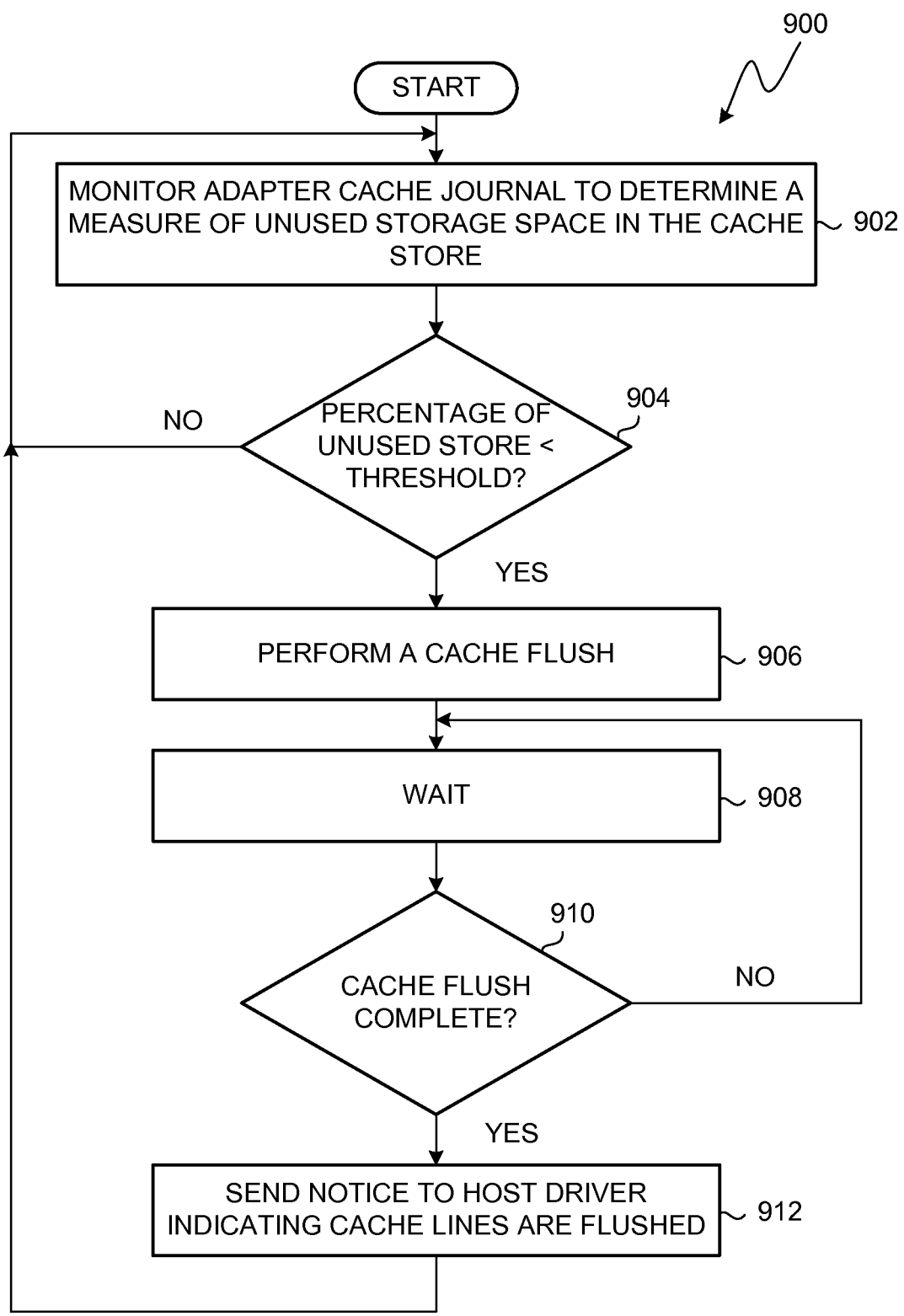
FIG. 9 includes a flow diagram that illustrates initiation of a cache flush operation by the PCIe adapter.

FIG. 9 includes a flow diagram that illustrates a method 900 for initiation of a cache flush operation by the PCIe adapter 200. As indicated in block 902, the cache journal 226 is monitored to determine a measure of the unused storage space in the cache store 300. In block 904, the measure determined in block 902, or a derivation of that measure, is compared with a threshold. When the percentage of unused storage capacity in the cache store 300 is less than a threshold value, the PCIe adapter 200 performs a cache flush operation as indicated in block 906. Otherwise, processing continues by repeating the functions of block 902 and block 904.

In block 908, the PCIe adapter 200 waits for a designated time before determining in block 910 whether the PCIe adapter 200 has determined that the cache flush is complete. When the PCIe adapter 200 determines that the cache flush is not complete, processing returns to repeat the wait indicated in block 908. Otherwise, the method 900 continues by sending a notice to the modified driver 125 in the host system 100 indicating that the cache lines have been flushed, as shown in block 912. Thereafter, the method 900 continues by repeating the functions in block 902 through block 910.

Processor executable instructions and data that support and/or enable the modified driver 125 and the host cache journal 126 in the host system 100 may be stored on a computer-readable medium in a non-transitory form. The executable instructions, operating parameters and/or data contained therein may be implemented in a non-volatile memory such as the memory 120. In addition, processor executable instructions and data that support and/or enable the PDS logic 222, cache logic 224, and the cache journal 226, in the PCIe adapter 200 may be stored on a computer-readable medium in a non-transitory form. The executable instructions, operating parameters and/or data contained therein may be implemented in a non-volatile memory such as the memory 220.

Although the illustrated embodiments include a single host system 100 and a single primary data store 140, it should be understood that the PCIe adapter 200 and the controller cache store 250 can be adaptively scaled to support data transfers between additional hosts including virtual hosts and any number of desired data volumes supported by one or more primary data stores.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or in parallel (at the same time, overlapping in time, or substantially simultaneously) with other steps without departing from the scope of the invention. In some instances, certain steps may be omitted or not performed without departing from the invention. Further, words such as "thereafter", "then", "next", "subsequently", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention.

In one or more exemplary aspects as indicated above, the functions described may be implemented in hardware, software, firmware, or any combination thereof. If implemented in software, the functions may be stored as one or more instructions or code on a computer-readable medium, such as a non-transitory processor-readable medium. Computer-readable media include data storage media.

A storage media may be any available media that may be accessed by a computer or a processor. By way of example, and not limitation, such computer-readable media may comprise RAM, ROM, EEPROM, CD-ROM or other optical disk storage, magnetic disk storage or other magnetic storage devices, flash memory or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made herein without departing from the present systems, methods and computer-readable storage media, as defined by the following claims.

The invention claimed is:

1. A method for processing data transfers between a host system and a cache supporting a peripheral component interconnect express (PCIe) adapter, the method comprising:

receiving, with a PCIe adapter interface, a request originating in a host system coupled to the PCIe adapter, the request defining an input/output operation designated for a data volume supported by the PCIe adapter, information associated with the input/output operation bypassing a copy operation to a kernel space of the host system, the request originating in the host system, processed by a host driver executing on the host system, the host driver maintaining a host cache journal;

forwarding information responsive to the request from the PCIe adapter interface to a cache coupled to the PCIe adapter, a PCIe adapter maintaining a PCIe adapter cache journal;

transmitting, with the PCIe adapter interface, a response to the host system, the response indicating that the input/output operation designated for the data volume supported by the PCIe adapter is complete;

identifying, with the PCIe adapter, a set of contiguous cache lines in the cache;

forwarding, with the PCIe adapter, information from the set of contiguous cache lines to a RAID data volume;

updating the PCIe adapter cache journal; and communicating an indication of an event to the host driver.

2. The method of claim 1, wherein the kernel space of the host system is mapped to a memory space that manages the cache.

3. The method of claim 1, wherein the request originating in the host system, is initiated by an application executing on the host system.

4. The method of claim 1, wherein the request originating in the host system, is initiated by an operating system on the host system.

5. The method of claim 1, wherein forwarding information responsive to the request from the PCIe adapter interface is responsive to a media access control to physical layer interface command that is generated and communicated from the host driver.

6. The method of claim 1, wherein the host system identifies a base-address register accessible via a bus in the PCIe adapter.

7. The method of claim 6, wherein the PCIe adapter exposes a memory capacity to the host system via the bus in the PCIe adapter.

8. The method of claim 1, wherein transmitting a response to the host system includes communicating to the host driver.

9. The method of claim 1, wherein the indication of the event instructs the host system that the contiguous cache lines forwarded by the PCIe adapter to the RAID data volume are no longer present in the cache.

10. A data storage system, comprising:
a host computer executing a host driver and supporting a source of an input/output operation request directed to a logical volume supported by data storage devices external to the host computer, the host driver enabling a zero copy of information associated with the input/output operation to bypass a copy operation to a kernel space of an operating system functioning on the host computer when the information transitions from the host computer to the data storage devices; and
a PCIe adapter communicatively coupled to the host computer via a host interface, the PCIe adapter further coupled to a cache and having a device manager, the PCIe adapter coupled to the data storage devices supporting the logical volume via the device manager, the data storage devices arranged in a redundant array of inexpensive disks, the PCIe adapter arranged to place the zero copy of information associated with the input/output operation in the cache, the PCIe adapter and the host driver arranged to maintain respective cache journals, the PCIe adapter programmed to identify contiguous cache lines in the cache, store the information from the contiguous cache lines to the logical volume, update a PCIe adapter cache journal and communicate an event to the host driver.

11. The data storage system of claim 10, wherein the source of the input/output operation request is a user application.

12. The data storage system of claim 10, wherein the PCIe adapter responds to a media access control to physical layer interface command generated in the host driver.

13. The data storage system of claim 10, wherein the host computer identifies a base address register accessible via a bus in the PCIe adapter.

14. The data storage system of claim 13, wherein the PCIe adapter exposes a memory capacity to the host system via the bus in the PCIe adapter.

15. The data storage system of claim 10, wherein the indication of the event instructs the host computer that the contiguous cache lines are no longer present in the cache.

16. A computer-readable medium having stored thereon, in non-transitory form, instructions that, when executed by a processor on a host system direct the host system to:
receive a request originating in the host system, the request defining an input/output operation designated for a data volume supported by a PCIe adapter coupled to the host computer, information associated with the input/output operation bypassing a copy operation to a kernel space of the host system, the request processed by a host driver executing in the host system;
generate a media access control to physical layer interface command that instructs the PCIe adapter to access a cache coupled to the PCIe adapter, identify a set of contiguous cache lines in the cache, forward information from the set of contiguous cache lines to a RAID data volume, and update a cache journal;
wait for an indication from the PCIe adapter that the input/output operation was completed by the PCIe adapter; and
forward information to a source of the request indicating that the input/output operation designated for the data volume is complete, the information indicative of an event.

17. The computer-readable medium of claim 16, further directing the host system to: modify a cache journal in the host system.

18. The computer-readable medium of claim 17, wherein an address identifying a storage location within the cache coupled to the PCIe adapter is mapped to a host kernel space.

19. The computer-readable medium of claim 16, wherein the request originates in an application executing in the host system.

20. The computer-readable medium of claim 16, wherein the request originates in an operating system executing in the host system.

* * * * *